United States Patent [19]
von Ohain, Hans J. P. et al.

[11] 3,724,784
[45] Apr. 3, 1973

[54] WING WITH THRUST AUGMENTOR

[75] Inventors: Hans J. P. von Ohain; William S. Campbell, both of Dayton, Ohio

[73] Assignee: The United States of America as represented by the Secretary of the Air Force

[22] Filed: Sept. 10, 1971

[21] Appl. No.: 179,520

[52] U.S. Cl............................................244/42 CC
[51] Int. Cl...............................................B64c 9/38
[58] Field of Search ...244/42 CC, 42 CD, 42 CF, 35, 244/40, 45

[56] References Cited

UNITED STATES PATENTS 2,885,162  5/1959  Griswold..........................244/42 CC
2,973,922  3/1961  Davidson et al..................244/42 CC

FOREIGN PATENTS OR APPLICATIONS 715,656  1/1942  Germany..........................244/42 CD Primary Examiner—Milton Buchler
Assistant Examiner—Carl A. Rutledge
Attorney—Harry A. Herbert, Jr. et al.

[57] ABSTRACT

The invention relates to a propulsion and sustension system for aircraft in which a wing is provided having an extended laminar flow airfoil section with the maximum thickness aft of the 70 percent chord point. The wing has at least one surface having a convex portion extending aft of the point of maximum thickness and coupled to a concave section extending to the trailing edge of the airfoil section or faired into the surface of a flap extending beyond the airfoil trailing edge. The wing is provided in the vicinity of the aforementioned convex section with a plurality of nozzles connected to a primary source of air under pressure. The nozzle assemblies extend spanwise in closely spaced relation and inject high velocity jets of air into the airflow over the wing in the zones over the convex portion and induce a secondary flow including the boundary layer to mix therewith and to be accelerated in the zones adjacent the convex section. The mixed flow is decelerated with an accompanying pressure rise in the zones adjacent the concave section. This action augments the thrust which would be produced by the primary jets of air if acting alone. By means of a simple flap arrangement it is possible to vector the thrust to produce a lift component.

8 Claims, 7 Drawing Figures

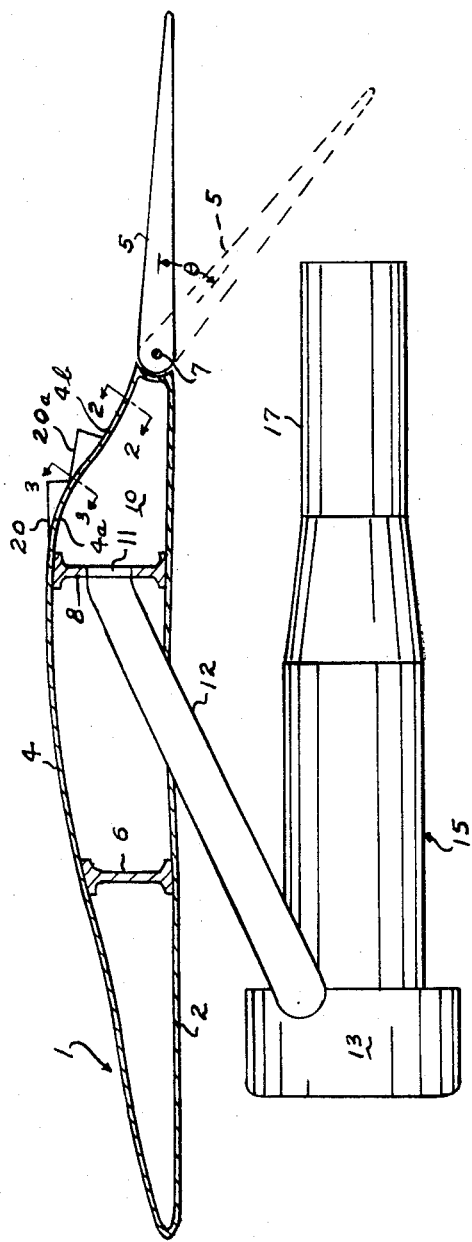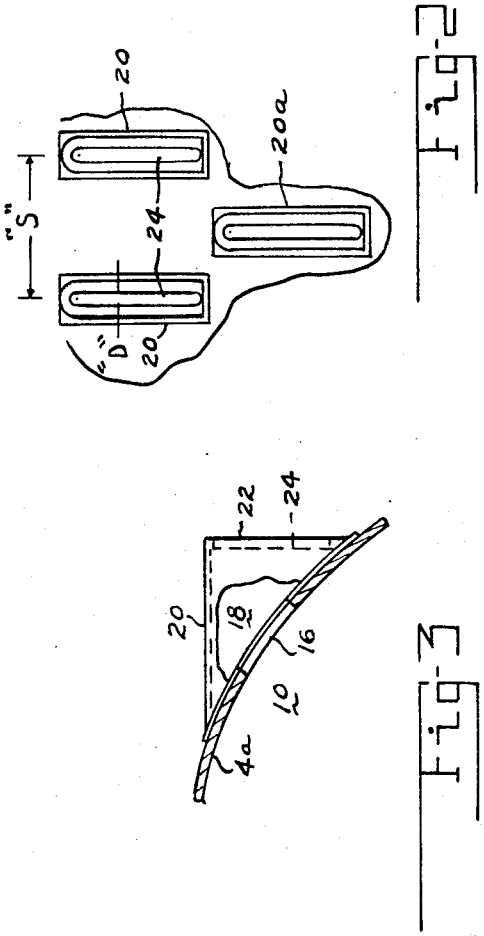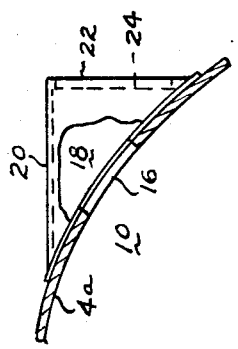

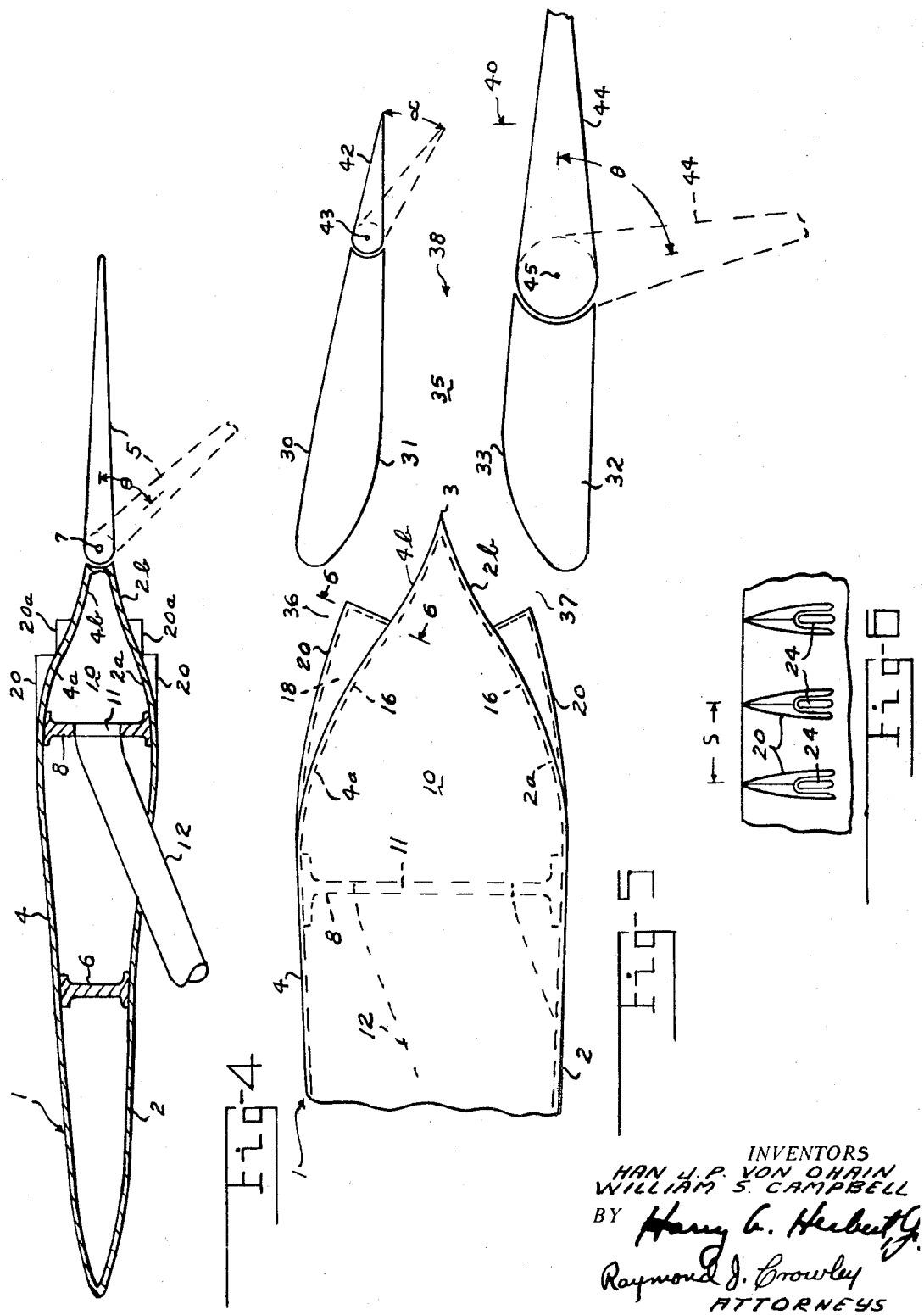

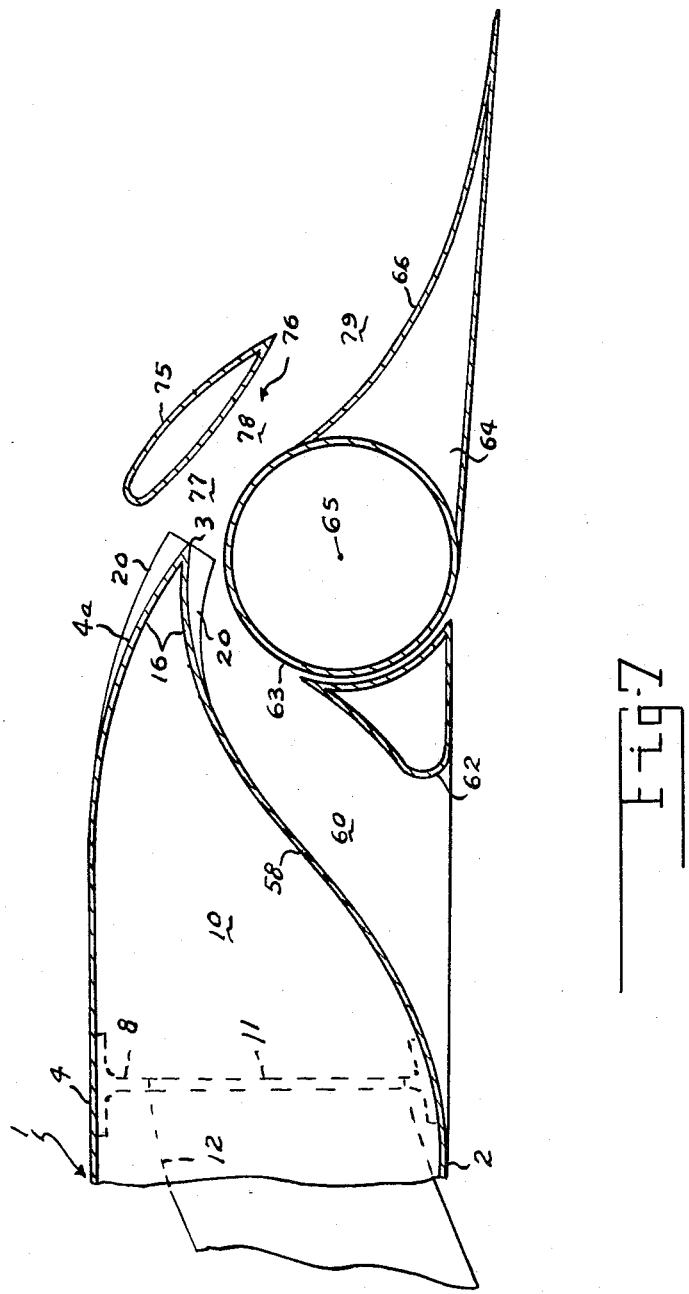

WING WITH THRUST AUGMENTOR

BACKGROUND OF THE INVENTION

1. Field of the Invention

The invention relates to aircraft wings in which there is combined therewith a jet propulsion means with thrust augmentation and in which the induced mass flow is derived from airflow over the wing surface including the boundary layer.

2. Description of the Prior Art

It has heretofore been proposed by Bertin and Co. Jahbuch 1960 der Wissenschaftlichen Gesellschaft fuer Luftfahrt, paper by P. Guienne, relating to ejectors, pages 76 through 81, and U. S. Pat. Nos. 3,045,947 to Bertin et al. and 3,259,340 to Whittley, to discharge compressed air from a narrow spanwise extending nozzle within a wing structure with the space between a pair of spaced shrouds or flaps serving to form a discharge channel and thrust augmenting duct. The flaps further can be deflected to vector the thrust to produce additional lift in the take off and landing phase. In the aforementioned prior art, all of the structure is encompassed within the contours of a conventional airfoil shape and the use of a single slot nozzle gives an inferior thrust augmentation. It is also known as shown in the U. S. Pat. No. 2,973,922 to propel an aircraft by a multiplicity of spanwise distributed jets over the rear suction surface of a conventional airfoil. The specific configuration of the laminar flow airfoil section as to the position of the point of maximum thickness, and the use of convex joined with a concave surface aft of the point of maximum thickness and the multiple injection nozzles arranged to inject jets of air immediately above the convex surface results in greatly improved mixing of the primary and secondary airstreams. This results in a propulsion system with an enhanced thrust augmentation ratio and vectoring of thrust with a less complex structure.

SUMMARY OF THE INVENTION

The invention relates to a continuous propulsion and sustension system for aircraft in which a multitude of jet streams of air are discharged in the vicinity of the aircraft wing which is of such a configuration that the aerodynamic flow over the wing and augmenting of the thrust are favorably effected. The wing is provided with an extended laminar flow airfoil section profile having its maximum thickness aft of the 70 percent chord point. The wing has at least one surface having a convex portion extending aft of the point of maximum thickness merging with a concave section which may terminate adjacent the normal trailing edge of the airfoil section or to smoothly fair into the surface of a trailing edge flap. A large number of primary air injection nozzles are arranged in spaced spanwise extending relation and are connected by means of a suitable duct structure to receive compressed air from the bypass section of a known type of turbofan engine. The primary air injection nozzles are positioned to inject relatively high velocity jets of air into the ambient airflow adjacent the aforementioned convex section of the airfoil aft of the point of maximum thickness, being a zone of high velocity and low pressure. Because the difference in the velocity of the airflow over the wing at this point, from the jet velocity, is a minimum, the maximum mixing of the two streams will occur. The nozzle assemblies are laterally spaced apart a distance of from 2 to 3½ inches and are constructed to discharge the air jets in the form of thin vertically extending ribbons of the order initially of from one-eighth to one-quarter inch thick. The jet streams, being of low static pressure, induce by aspirator action an inflowing secondary flow of air from the upper surface of the airfoil including the boundary layer. The induced secondary flow mixes with the high velocity primary flow which transfers kinetic energy thereto and the thrust produced by the change in momentum is considerably increased or augmented over the value of the thrust which would be produced by the primary jet flow acting alone. The particular combination of a laminar flow airfoil with maximum thickness aft of the seventy percent of the chord point behind the leading edge with the convex concave configuration of the airfoil surface and positioning the multiplicity of nozzles to inject the primary jets above the convex portion of the airfoil surface gives rise to an efficient thrust augmentor or ejector. The invention contemplates a further improved thrust augmenting means in the form of a pair of spanwise extending shrouds vertically spaced from each other and forming a convergent divergent duct therebetween. The entrance to the duct is adapted to receive the mixed primary and secondary flows including the boundary layer from at least the suction surface of the airfoil. One of the shroud surfaces may be in the form of a trailing edge flap or one or both shrouds may have such a flap incorporated therein and forming means for varying the ratio of inlet to exit area of the duct so as to regulate the magnitude and direction of the thrust vector.

In one form of the invention the mixed primary and secondary flow tends to expand and reduce its velocity with subsequent increase in static pressure immediately aft of the airfoil trailing edge. The mixed flow then passes over a conventional flap pivoted to the wing structure at the airfoil trailing edge and extending rearward therefrom. The accelerated flow over the upper surface of the flap removes the boundary layer therefrom preventing flow breakdown at high wing angles of attack. Further, the flow over the flap surface prevents flow breakdown when the flap is lowered through greater angles than with conventional flaps thus increasing the lift attainable when the flap is depressed. The flap extends spanwise coextensive with the spanwise distribution of the primary nozzle assemblies. Acceleration of the airflow also gives rise to the increase of lift by the phenomena of so-called super-circulation, see the article "Applying The Jet Flap" by David W. H. Godfrey in British THE AEROPLANE, No. 92, Apr. 12, 1957, pages 511–513.

In another form of the invention, the wing is constructed so that the airfoil section is convexly curved from the point of maximum thickness on both the pressure and suction surfaces of the airfoil. The convex sections then merge smoothly into concave sections extending to the trailing edge. The primary air injection nozzles are arranged in spanwise extending spaced relation on the convex sections on both the pressure and suction surfaces of the airfoil. A plain hinged flap is pivoted on the wing structure to extend rearward from the airfoil section trailing edge. This form of the invention functions in a manner similar to the simpler arrangement described above with the exception that when the flap is lowered the airflow over the flap on its pressure surface is deflected thus giving rise to an increased lift vector from one half of the augmented thrust.

In another form of the invention the airfoil section of the wing and general nozzle assembly is similar to the second form of the invention described immediately above. A pair of guiding surfaces called shrouds, in the form of thin airfoil section surfaces, are positioned in vertical spaced relation with the upper guide surface inverted with respect to the lower guide surface or shroud. The nose portions of the shrouds are positioned forward of the main wing trailing edge so as to provide an inlet adapted to receive secondary air flow respectively from the suction and pressure surfaces of the main airfoil section. The mixed flow passes into a venturi-shaped channel or duct formed by the internal space between the shrouds. This channel extending spanwise provides for expansion or diffusion of the mixed primary and secondary flows which are discharged at reduced velocity and higher static pressure from the channel at the trailing edge of the wing and produce an augmented thrust. As contrasted to the prior art, the shroud and duct structure forming an injector or thrust augmentor is rigid and built as an integral portion of the wing. In order to vector the thrust, one of the shrouds or the after portion of both the shrouds can be constructed in the form of a spanwise extending flap which, when lowered by power means or manually, deflects the thrust producing mixed primary and secondary flows to give a lift vector to the resultant thrust. To permit the lower guide surface or shroud flaps to be deflected to a greater angle without flow breakdown, additional compressed air may be blown thereover from a known type of Coanda slot. During take off and landing the flap or flaps are lowered in accordance with the airspeed condition and are raised for normal cruising speed. As distinct from the prior systems the propulsion means is continuously operative. In the preferred form of the invention, the thrust augmenting duct structure is simplified in that the duct is formed between a narrow chord spanwise extending shroud and the upper surface of a trailing edge flap. A fixed slot through the wing structure just forward of the flap serves to conduct flow from the pressure surface of the wing into the inlet of the thrust augmenting duct. Movement of the flap downward from the neutral or cruise position increases the outlet area of the thrust augmenting duct relative to the inlet area thereof and serving to regulate the thrust and lift to conform to the desired flight condition.

BRIEF DESCRIPTION OF THE DRAWINGS

FIG. 1 is a longitudinal cross-sectional view of a lift and propulsion system for aircraft in accordance with the invention.

FIG. 2 is an enlarged view taken on line 2—2 of FIG. 1 illustrating the arrangement of the primary injection nozzles.

FIG. 3 is an enlarged view, partly in section, illustrating details of a unit of the injector nozzle assembly.

FIG. 4 is a view illustrating a modified form of the invention with primary injection nozzles arranged on both pressure and suction surfaces of the wing airfoil section.

FIG. 5 is a side elevation of a form of the invention incorporating a shrouded thrust augmenting duct.

FIG. 6 is a view taken on line 6—6 of FIG. 5 illustrating the upper primary injection nozzle arrangement.

FIG. 7 is a view of a modified form of the invention similar to that illustrated in FIG. 5 except that only one shroud surface cooperating with a flap forms the thrust augmenting duct and a fixed slot is employed to lead pressure surface flow into the duct entrance.

DESCRIPTION OF THE PREFERRED EMBODIMENTS

A lift and propulsion system in accordance with the invention particularly well adapted to short take off and landing aircraft (STOL) is illustrated in FIG. 1. With reference to this figure, the reference numeral 1 generally indicates a wing having an extended laminar flow profile or airfoil section with a lower or pressure surface 2 and an upper or suction surface 4. The wing is preferably constructed of metal and has a front spar 6 and a rear spar 8. The rear spar 8 is positioned adjacent the point of maximum thickness of the wing airfoil section at a distance of the order of 70 to 80 percent of the airfoil section chord aft of the leading edge. The maximum thickness of the wing may be from 15 to 20 percent of the airfoil chord exclusive of the chord of any flap structure.

The suction surface 4 of the wing 1 is convex aft of the point of maximum thickness as indicated at 4a, FIG. 1, and extends rearward and downward to merge with a further concave section 4b which fairs into the upper surface of a plain flap 5 pivoted at 7 at what would be the normal trailing edge of the airfoil section of the wing. The flap 5 is adapted to be deflected to the dotted line position through an angle $\theta$ which may be of the order of 60°. The flap 5 may be deflected either manually or by power means, not shown, as well known in the art.

The internal space within the wing to the rear of the spar 8 forms a chamber or conduit 10 which communicates by means of a port 11 in the rear spar web with the conduit 12. The conduit 12 serves to continuously conduct compressed air to the chamber or conduit 10 from the fan section 13 of a conventional high bypass ratio turbofan engine generally indicated by the reference numeral 15. The engine 15 is provided with the usual tail pipe 17 for continuous discharge of the hot turbine exhaust gases to the atmosphere also producing thrust.

As further seen in FIG. 1, the convex portion 4a of suction surface 4 aft of the point of maximum thickness is provided with two rows of primary air injection nozzles, those in the upper row being indicated by the reference numeral 20 and in the lower row by reference numeral 20a. The nozzle assemblies are preferably of streamlined contour terminating with bluff trailing edge portions 22 (see FIG. 2). The nozzle assemblies 20 and 20a (as seen in FIG. 3) are hollow and form an internal chamber 18 communicating by means of suitable ports 16 cut through the wall of the convex portions 4a of the suction surface 4 of the wing 1 with the chamber or conduit 10. The compressed air delivered to the chamber 10 may pass by ports 16 into the chamber 18 of each nozzle assembly 20 and discharge with high velocity from narrow vertical orifices 24, FIG. 2, and the orifice vertical height may be of the order of one to three percent of the wing chord. The nozzle assemblies 20 are spaced apart spanwise a distance "S" as seen in FIG. 2, which may be of the order of 2 to 3 inches. Each of the nozzle assemblies 20 and 20a discharge high velocity jets of compressed air into the lower pressure zones of the airflow immediately above the convex airfoil surface section 4a. The nozzle assemblies 20 and 20a discharge velocity jets of air from the slit-like nozzle orifices 24, FIG. 2, so that the vertical extent of the thin jet streams extend substantially from the level of the point of maximum thickness of the airfoil section to the point of inflection where the convex portion changes to concave.

In operation of the lift and propulsion system of FIG. 1 during take off and landing, the flap 5 is lowered preferably by power means (not shown) under the pilot's control a suitable amount depending on whether the flight condition is take off or landing. For example, during take off the jet stream of hot gases discharged from the tail pipe 17 of the turbofan engine 15 will accelerate the aircraft to take off speed. The turbofan engine 15 in the meantime is delivering a major portion of its shaft power output to drive the fan section 13 of the engine 15. The fan section 13 may include a three stage fan driven in parallel with the axial flow compressor of the engine. The output of the fan section 13 of the engine will be a high volume flow of compressed air which is delivered by conduit 12 and port 11, FIG. 1, to the chamber 10 in the wing which, serving as a conduit, delivers compressed air to each of the primary nozzle assemblies 20 and 20a. The thin high speed vertically extending jets of air from the nozzle assemblies 20 and 20a enter the air flow over the suction surface of the wing in the zones adjacent the convex portion 4a of the wing airfoil section aft of the point of maximum thickness. In flowing over the convex portion 4a of the airfoil section, the streamlines tend to be thrown outward by centrifugal force causing the static pressure to fall and the velocity to increase. When the high velocity jets of primary air are injected into the accelerated ambient air, conditions are most favorable for adequate mixing since mixing losses are proportional to the square of the difference in the velocity of the jet compared to the free stream velocity. Further good mixing is enhanced because the thin jets of primary air tend to wave laterally and to intimately contact the induced secondary air and transfer kinetic energy thereto. Because of the close spacing of the nozzle assemblies, the thinness and large vertical extent of the jets and large number of the jets, the energy transfer from the primary to secondary flow is maximized.

The flow of the partially mixed flow over the concave section 4b of the airfoil section has the effect of crowding the streamlines causing a gradual increase in static pressure and a decrease in velocity, a condition similar to diffusion and resulting in ability to overcome the adverse pressure gradient. The decrease in velocity and increase in static pressure of the mixed flow gives rise to a thrust augmentation such that the thrust may be from 1.5 to 2 times the thrust of the primary jets if acting alone during a flight condition such as take off. The acceleration of the airflow over the suction surface of the wing removes the boundary layer therefrom thus reducing air friction losses and enables the flow to overcome a high adverse pressure gradient and enable a larger flap deflection to be obtained without flow breakdown. Further, when the flap is deflected, the accelerated airflow thereover tends to adhere to the flap upper surface and the total airflow stream receives a downward deflection by Coanda effect with production of a vertical lift vector from the thrust. The acceleration of the flow by means of the primary jets in addition to producing the major portion of the propulsive thrust also produces an increase of circulation about the wing which, when combined with the normal chordwise airflow, produces an increased lift to produce a steep ascent flight path.

When the aircraft equipped with the propulsion system of FIG. 1, reaches cruise altitude, the flap 5 is raised to the full line position of FIG. 1 with the nozzle assemblies 20 and 20a continuing effective in producing thrust. As the aircraft forward speed increases, the thrust augmenting effect will decrease but the removal of the boundary layer will reduce friction drag so that the propulsion system remains efficient.

The embodiment of the invention as illustrated in FIG. 4 is similar to that of FIG. 1 with corresponding parts indicated by the same reference characters as in FIGS. 1 to 3 inclusive. The system of FIG. 4 differs in that the pressure surface 2 of the airfoil section of the wing 1 is convexly and concavely curved aft of the point of airfoil maximum thickness, as indicated respectively at 2a and 2b, identical to the similar formation of the suction surface at corresponding points 4a and 4b, FIG. 1. Further, the surface section 2a of the pressure surface 2 is also provided with a set of primary air injection nozzles 20 and 20a. All of the primary injection nozzles are supplied by compressed air from chamber 10 in exactly the same manner as in the system of FIG. 1, the ports 16 (FIG. 3) not being illustrated in FIG. 4. The system of FIG. 4 operates in general similar to that of FIG. 1 with the exception that boundary layer removal is more effective and a higher thrust augmenting ratio can be achieved because of the larger number of primary nozzles available. The device of FIG. 4 is more effective in vectoring the thrust to produce an increased lift since the increased mass flow on the pressure side of the wing is directly deflected by the flap 5 when lowered in the manner described above, with respect to the system of FIG. 1.

The lift and propulsion system of FIG. 5 is a further extension of the propulsion system of FIG. 4 with like parts illustrated with corresponding reference numerals. In the system of FIG. 5, the plain flap 5 hinged at the trailing edge of the airfoil section as provided in the devices of FIGS. 1 and 4, is eliminated. Further, only one set of primary injection nozzles 20 are positioned on the respective convex surface sections 4a and 2a of the suction surface 4 and pressure surface 2 respectively. The nozzle assemblies are spaced spanwise of the wing in the manner as shown in FIG. 6 with the spacing "S" being for example two inches.

As further seen in FIG. 5, two spaced guiding surfaces or shrouds of airfoil shape 30 and 32 respectively are positioned above and below the trailing edge 3 of the airfoil section of the main wing 1 with the nose of each guiding surface extending forward of the trailing edge 3. The airfoil shaped guide surfaces 30 and 32 have their normal suction surfaces 31 and 33 respectively opposite each other to form a spanwise extending venturi-shaped passage 35. The passage 35 has a pair of split inlet slots 36 and 37 which merge to form a convergent entrance for air flow. The passage 35 expands beyond the constricted throat to form a diffuser section 38 terminating in the exit opening 40.

The upper guide surface or shroud 30 is provided with a plain trailing edge flap 42 pivoted at 43 which can be lowered to the dotted line position through the angle $\alpha$ by power actuating means, not shown, under the control of the pilot. Similarly, the lower guide surface or shroud 32 is provided with a larger trailing edge flap 44 pivoted at 45, which can be deflected downward through the angle $\theta$ to the dotted line position by pilot controlled power actuated means, not shown.

In operation, the system of FIG. 5 during take off and landing has the guide surface flaps 42 and 44 at least partially deflected. The primary jets of air issuing from the nozzle orifices 24, FIG. 6, of the nozzle assemblies 20 project into the lower pressure zones existing in the inlet slots 36 and 37 and induce a strong secondary air flow therethrough from the ambient air flow over the rear portion of the airfoil surfaces 2 and 4 including the boundary layer on those surfaces. The primary and secondary flows of air intermix with consequent transfer of kinetic energy to the secondary flow in the forward portion of the channel 35. The flow expands in the diffuser section 38 and exits at 40. With the increase in mass flow, the thrust produced by the discharge of compressed air from the nozzle assemblies 20 is augmented and with the flaps 42 and 44 depressed, the jet stream is deflected producing a lift component, the magnitude of which can be controlled. In high speed flight, the flaps 42 and 44 are retracted to the inactive full line position in FIG. 5 and channel 35 then serves to continue discharge of the jet propulsion stream with the benefits of continuous removal of the wing boundary layer and serving as an efficient propulsion means.

It will be understood that in the system disclosed in FIG. 5, the guide surfaces 30 and 32 will be suitably rigidly supported from the wing structure by means of supporting webs or the like, not shown.

In the embodiment of the invention as illustrated in FIG. 7 the forward portion of the wing 1 is the same as illustrated in FIG. 1 and is not shown. The pressure surface 2 of the wing 1 is curved upward in an S-shaped configuration to form the front wall 58 of a wing slot generally indicated at 60 and having its entrance opening on the pressure surface 2. The rear wall of the slot is formed by a stationary wall 62 and by the circular arc nose portion 63 of a flap 64 pivoted at 65 for rotational movement from the neutral position shown to a downward position of the order of 60° deflection.

The suction surface 4 aft of the position of the rear spar 8 is convexly curved downward as at 4a to terminate at the intersection with the slot wall 58 at what would normally be the trailing edge 3 of the airfoil section of the wing. The upper surface 66 of the flap 64 is concavely formed so as to be in conjunction with the surface 4a to be the equivalent of the surfaces 4a, 4b and upper surface of flap 5 in the form of the invention as shown in FIG. 1. A stationary airfoil shaped, spanwise extending slat, or shroud 75 is positioned above the upper surface of the flap as to form a convergent-divergent diffuser duct 76 having a convergent entrance section 77, a throat section 78 of constant cross section and a divergent diffuser exit portion 79. The nozzles 20 fed by compressed air through ports 16 from the conduit chamber 10 in the wing inject high velocity jets of primary air into the entrance 77 of the duct 76. By so-called ejector action secondary air flow including the boundary layer is induced to flow from adjacent the suction surface into the duct entrance 77. Similarly, air flow from the pressure surface 2 of the wing is induced to flow through the slot 60 and mix with the primary jets flowing into the duct entrance 77. In general, the device of FIG. 7 operates in take off, cruise and landing flight conditions in a manner similar to that of the assembly of FIG. 5. The arrangement of FIG. 7 is however more simple from a structural standpoint. It will be understood that if desired the shroud 75 of FIG. 7 could be constructed to be rotatable so as to enable further control of the duct inlet exit area ratio and the magnitude of the lift component of the thrust vector equivalent to the function of the flaps 42 of the system of FIG. 5.

I claim:

1. In an aircraft sustension and propulsion system, a wing having an airfoil section, the maximum thickness of the airfoil being positioned aft of the 70 percent point of the wing chord, a spanwise extending flap pivotally mounted on the wing at the trailing edge of the airfoil section, the suction surface of said wing being convexly curved downward and rearward from the point of maximum thickness and merging with a concave section smoothly faired into the upper surface of said flap, said wing having a conduit means positioned therein, and adapted to be connected to a source of air under pressure, a plurality of primary air injection nozzles each connected to said conduit means, said primary air injection nozzles being laterally closely spaced spanwise on the wing adjacent the said convexly curved portion of the wing aft of the point of maximum thickness and said nozzles injection high velocity jets of air in the form of thin sheets having a vertical extent substantially equal to the vertical height of said convexly curved wing portion, said nozzles injecting high velocity jets of air into the airflow over said airfoil in the zones of low pressure adjacent said convexly curved portion of the wing, said primary jets causing an induced secondary flow of air over the suction surface of the wing to become entrained therein and mixing of the primary and secondary flows taking place in the zones of higher static pressure above the concave section of the suction surface of said wing and over said flap, the acceleration of the flow including the boundary layer over at least the after portion of the wing reducing the wing drag in level flight, augmenting the thrust over the thrust produced solely by the primary jets and permitting the wing to attain higher angles of attack without flow breakdown when the flap is lowered to increase the lift during take off and descent.

2. The structure as claimed in claim 1, in which the pressure surface of the wing aft of the point of maximum thickness is also convexly and then concavely curved and then faired into the under surface of the flap and the rear portion of the pressure surface of the wing also being provided with primary air injection nozzles laterally spaced to inject air into the low pressure zone adjacent said convexly curved portion of the pressure surface of the wing aft of the point of maximum thickness, the acceleration of the boundary layer on both sides of said flap permitting larger downward flap deflection without flow breakdown and giving an increased total lift with flat deflection.

3. In a continuously operable aircraft sustension and propulsion system, a wing having an extended laminar flow airfoil section with the maximum thickness positioned 70 or more percent of the airfoil chord aft of the leading edge, said airfoil having pressure and suction surfaces, at least one of said surfaces being convexly curved from the point of maximum thickness and then concavely curved extending at least to the airfoil trailing edge, a plurality of spaced spanwise distributed injection nozzles positioned on the wing to inject spaced primary jets of air immediately adjacent the convexly curved portion of the said airfoil surface, said primary jets inducing a secondary flow over said airfoil to accelerate and mix with the primary flow, the mixed flow decelerating and increasing in pressure over the said concave portion of said airfoil surface to produce a thrust reaction greater than the thrust of the primary jets of air alone.

4. In an aircraft sustension and propulsion system, a wing having a laminar flow airfoil section with the point of maximum thickness located in the order of 70 or more percent of the chord aft of the leading edge, said airfoil section having its pressure and suction surfaces each convexly curved from the point of maximum thickness toward each other and then concavely curved to meet at the trailing edge, means supported by said wing providing a pair of spaced spanwise extending guiding surfaces forming a convergent-divergent flow passage therebetween, said flow passage having its convergent entrance extending forward from the said airfoil trailing edge and adapted to receive flow from the suction and pressure surfaces of the wing including the boundary layer flow, said convergent-divergent flow passage having at least the divergent portion thereof extending aft of the trailing edge of said wing airfoil section, a plurality of injection nozzle assemblies positioned above and below the wing airfoil section trailing edge, said nozzle assemblies being closely spaced spanwise for the length of said convergent-divergent flow passage, said injection nozzle assemblies being adapted to be connected to a source of air under pressure, and injecting primary jets of high velocity air into the convergent portion of said flow passage, said primary jets entraining a secondary flow into the inlet of said flow passage to mix with the primary flow and the combined flow expanding in and discharging from the divergent portion of said flow passage with a mass flow producing a greater thrust than the thrust produced by said primary jets if acting alone.

5. The structure as claimed in claim 4, in which at least one of said guiding surfaces has the after portion thereof formed as a pivoted trailing edge flap adapted to be lowered to deflect the ambient airstream therebelow to increase wing lift.

6. The structure as claimed in claim 4 in which each of said guiding surfaces is provided with a portion thereof forming a trailing edge flap and the flaps when simultaneously downwardly deflected correspondingly deflecting the mass flow discharged from the flow passage and producing a lift component from the thrust.

7. In a continuously operable aircraft sustension and propulsion system, a wing having an extended laminar flow airfoil section, said wing being provided with a spanwise extending flap, the point of maximum thickness of the airfoil section being of the order of 70 or more percent of the airfoil chord exclusive of the chord of the flap aft of the airfoil leading edge, said airfoil having one of the surfaces thereof formed aft of the said point of maximum thickness with a convex curved portion merging with a concave curved portion and faired into the surface of said flap, a set of closely spaced spanwise distributed injection nozzles adapted to be connected to a continuously supplied compressed air conduit within the wing structure, said nozzles being positioned so as to discharge thin high velocity jets of air rearward above the said convexly formed surface of the wing, a streamlined spanwise extending shroud positioned above the after portion of the airfoil section and over at least the forward portion of said flap, said shroud and the airfoil and flap surfaces defining therebetween a convergent-divergent ejector duct, the discharge of said injector nozzles into the entrance of said ejector duct entraining air flowing rearward over at least the airfoil suction surface including the boundary layer, deflection downward of said flap from the normal cruise position increasing the ratio of the discharge area to the inlet of the ejector duct and adapted to deflect the net augmented thrust vector to produce an increase in the lift and the circulation about the wing and said injection nozzles and ejector duct producing an augmented thrust reaction continuously throughout the flight regime.

8. In an aircraft sustension and propulsion system, a wing having an extended laminar flow airfoil section, said wing being provided with a trailing edge spanwise extending flap, the maximum thickness of the airfoil section being positioned in the order of 60 or more percent of the wing chord including the chord of the flap aft of the leading edge, said wing airfoil section having a pressure surface and a suction surface, said suction surface of the wing being convexly curved downward and rearward from the said point of maximum thickness and merging with a concave section and then smoothly faired into the upper surface of said flap, a spanwise extending guiding surface supported by the wing and vertically spaced above the airfoil suction surface adjacent the point of juncture of the convex and concave portions thereof and forming a convergent-divergent flow passage therebetween adapted to act as an ejector duct, a slot extending through the wing and forming a flow passage with the inlet on the airfoil pressure surface forward of the trailing edge flap and the slot having an outlet terminating adjacent the entrance to said ejector duct, means within the wing structure forming a spanwise extending conduit adapted to be connected to a continuous supply of compressed air, a plurality of nozzles each connected to said conduit and distributed spanwise on the wing and adapted to inject primary jets of air into the entrance of said ejector duct, said primary jets of air by aspirating action inducing an inflow of secondary air from the pressure and suction surfaces of the airfoil into said ejector duct, the expanded mixed flow giving rise to an augmented thrust greater than the thrust of the nozzle discharge alone and deflection of said flap downward vectoring the thrust to give rise to a lift component and increasing overall circulation around the wing and deflection of the flap varying the ratio of discharge area to inlet area of the said ejector duct to match the requirements of the desired flight condition.

* * * * *